(12) United States Patent
Watanabe et al.

(10) Patent No.: US 12,325,304 B2
(45) Date of Patent: Jun. 10, 2025

(54) IN-VEHICLE DISPLAY DEVICE

(71) Applicant: AGC Inc., Tokyo (JP)

(72) Inventors: Toshinari Watanabe, Chiyoda-ku (JP); Atsushi Inoue, Chiyoda-ku (JP); Ryou Hokari, Chiyoda-ku (JP); Yasuhiro Inoue, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 96 days.

(21) Appl. No.: 18/480,676

(22) Filed: Oct. 4, 2023

(65) Prior Publication Data
US 2024/0025258 A1 Jan. 25, 2024

Related U.S. Application Data

(63) Continuation of application No. PCT/JP2022/017072, filed on Apr. 4, 2022.

(30) Foreign Application Priority Data

Apr. 9, 2021 (JP) .................. 2021-066497

(51) Int. Cl.
H04N 7/01 (2006.01)
B60K 35/60 (2024.01)
B60K 35/22 (2024.01)

(52) U.S. Cl.
CPC .............. *B60K 35/60* (2024.01); *B60K 35/22* (2024.01); *B60K 2360/652* (2024.01); *B60K 2360/691* (2024.01); *B60K 2360/693* (2024.01)

(58) Field of Classification Search
USPC .......................................... 348/837
See application file for complete search history.

(56) References Cited

U.S. PATENT DOCUMENTS

2011/0254916 A1* 10/2011 Fan .................. G02B 30/52
348/E13.026
2013/0139990 A1* 6/2013 Appleby ................ F01D 5/18
164/47

FOREIGN PATENT DOCUMENTS

WO WO 2016/027812 A1 2/2016

* cited by examiner

*Primary Examiner* — Nigar Chowdhury
(74) *Attorney, Agent, or Firm* — Oblon, McClelland, Maier & Neustadt, L.L.P.

(57) ABSTRACT

An in-vehicle display device includes n layers from a cover glass to a housing bottom member, including a display panel midway thereof. The housing bottom member is fixed to an interior portion of a vehicle at at least two fixing points. When a virtual plane R is defined based on the two fixing points, a distance $Z_{cg}$ is defined based on a main surface of the cover glass and the virtual plane R, and a distance Z is defined based on a main surface of the display panel and the virtual plane R, a ratio $Z/Z_{cg}$ is 0.6 or less. When a virtual line L is defined based on the main surface of the display panel and the virtual plane R, the n layers satisfy Expression (1).

18 Claims, 8 Drawing Sheets

IN-VEHICLE DISPLAY DEVICE

CROSS-REFERENCE TO RELATED APPLICATIONS

This is a continuation of International Application No. PCT/JP2022/017072 filed on Apr. 4, 2022, and claims priority from Japanese Patent Application No. 2021-066497 filed on Apr. 9, 2021, the entire content of which is incorporated herein by reference.

TECHNICAL FIELD

The present invention relates to an in-vehicle display device.

BACKGROUND ART

In the related art, there is an in-vehicle display device including a display panel and a cover glass.

As described in Patent Literature 1, a cover glass of an in-vehicle display device is "required to have, from the viewpoint of safety, excellent impact resistance to such an extent that the cover glass is not broken even when a head or the like of an occupant hits the cover glass in a vehicle collision accident" ([0005]).

Patent Literature 1 discloses that when an in-vehicle display device including a cover glass satisfies "Expression (I): $P \leq 0.0302 t_1^2 + 0.0039 t_1 + 0.0478$", the cover glass has excellent impact resistance ([0007] to [0008]). The P value in the "Expression (I)" can be considered to be an index indicating a rigidity of the in-vehicle display device.

CITATION LIST

Patent Literature

Patent Literature 1: WO2016/027812

SUMMARY OF INVENTION

Technical Problem

The in-vehicle display device usually includes a housing bottom member. The housing bottom member constitutes a housing that houses each portion of the in-vehicle display device.

The housing bottom member is fixed to an interior portion (such as a dashboard) of a vehicle via a fixing member such as a bracket.

The in-vehicle display device includes a "standing type" one in which only a lower end of the housing bottom member is fixed to a dashboard, and an "in-dash type or on-dash type" one in which the vicinity of an upper end of the housing bottom member is also fixed to a dashboard.

Hereinafter, for convenience, the "in-dash type or on-dash type" is also simply referred to as an "in-dash type".

Patent Literature 1 substantially discloses only a standing type in-vehicle display device (see FIG. 4 in PTL 1).

The in-dash type in-vehicle display device has a smaller protrusion from the dashboard, is stronger in a fixed state, and tends to have lower impact absorption, as compared with the standing type in-vehicle display device.

Therefore, the in-dash type in-vehicle display device has a range of a rigidity required for the cover glass to exhibit good impact resistance, which may be different from that of the standing type in-vehicle display device. That is, the in-dash type in-vehicle display device may be insufficient to satisfy only the "Expression (I)" described in Patent Literature 1.

In recent years, for the purpose of weight reduction or the like, a housing bottom member having a rib is used in some cases, and in consideration of this point as well, it is necessary to consider the rigidity of the in-vehicle display device.

The present invention has been made in view of the above points, and an object thereof is to provide an in-dash type or on-dash type in-vehicle display device in which a cover glass has excellent impact resistance.

Solution to Problem

As a result of intensive studies, the inventors of the present invention have found that the above object can be achieved by adopting the following configuration, and have completed the present invention.

That is, the present invention provides the following [1] to [10].

[1] An in-vehicle display device having n layers from a cover glass to a housing bottom member and including at least a display panel midway in the n layers thereof, in which a member of each layer includes only a plate-shaped member, or includes the plate-shaped member and a rib, the housing bottom member is fixed to an interior portion of a vehicle at at least two fixing points, when a virtual plane passing through an intermediate point between the two fixing points and perpendicular to a line connecting the two fixing points is defined as a virtual plane R, a length of an intersection line between a main surface of the cover glass and the virtual plane R is defined as a distance $Z_{cg}$, and a length on an intersection line between a main surface of the display panel and the virtual plane R from an upper end to a point corresponding to the intermediate point is defined as a distance Z, a ratio $Z/Z_{cg}$ of the distance Z to the distance $Z_{cg}$ is 0.6 or less, and the n layers from the cover glass to the housing bottom member on a virtual line L passing through a 5 mm lower end side from the upper end of the intersection line between the main surface of the display panel and the virtual plane R in a thickness direction of the in-vehicle display device satisfy the following Expression (1).

[2] An in-vehicle display device having n layers from a cover glass to a housing bottom member and including at least a display panel midway in the n layers thereof, in which a member of each layer includes only a plate-shaped member, or includes the plate-shaped member and a rib, the housing bottom member is fixed to an interior portion of a vehicle at one fixing point, when a virtual plane passing through the fixing point and including a thickness direction and a vertical direction of the cover glass at the fixing point is defined as a virtual plane R, a length of an intersection line between a main surface of the cover glass and the virtual plane R is defined as a distance $Z_{cg}$, and a length on an intersection line between a main surface of the display panel and the virtual plane R from an upper end to a point corresponding to the fixing point is defined as a distance Z, a ratio $Z/Z_{cg}$ of the distance Z to the distance $Z_{cg}$ is 0.6 or less, and the n layers from the cover glass to the housing bottom member on a virtual line L passing through a 5 mm lower end side from the upper end of the intersection line between the main surface of the display panel and the virtual plane R in a thickness direction of the in-vehicle display device satisfy the following Expression (1).

[3] The in-vehicle display device according to the [1] or [2], in which the housing bottom member is fixed to the interior portion by a bracket.

[4] The in-vehicle display device according to any one of the [1] to [3], in which the n layers from the cover glass to the housing bottom member on the virtual line L further satisfy the following Expression (5).

[5] The in-vehicle display device according to any one of the [1] to [4], in which the cover glass is a strengthened glass having a compressive stress layer thickness of 10 μm or more, the cover glass has a thickness of 0.5 to 2.5 mm, the cover glass has a Young's modulus of 60 to 90 GPa, the display panel has a Young's modulus of 60 to 90 GPa, and the housing bottom member has a Young's modulus of 40 to 250 GPa.

[6] The in-vehicle display device according to any one of the [1] to [5], in which a deceleration of an impactor is 50 G or more in a head impact test in which the impactor collides with a hitting point P on the main surface of the cover glass through which the virtual line L passes such that an energy at the time of collision is 152 J.

[7] The in-vehicle display device according to any one of the [1] to [6], in which when a mass of the in-vehicle display device per unit area of the cover glass is defined as M, the following Expressions (6) and (7) are satisfied.

[8] The in-vehicle display device according to any one of the [1] to [7], further including a housing side wall provided at a position facing an end surface of the display panel, in which a distance d1 between the end surface of the display panel and the housing side wall is 2 mm or less.

[9] The in-vehicle display device according to any one of the [1] to [8], in which a distance d2 between an end of the display panel and a member closer to the housing bottom member than the display panel is 1 mm or less.

[10] The in-vehicle display device according to any one of the [1] to [9], in which the n layers from the cover glass to the housing bottom member on the virtual line L satisfy the following Expression (4A).

Advantageous Effects of Invention

According to the present invention, it is possible to provide an in-dash type or on-dash type in-vehicle display device in which the cover glass has excellent impact resistance.

DESCRIPTION OF EMBODIMENTS

Figure 1:
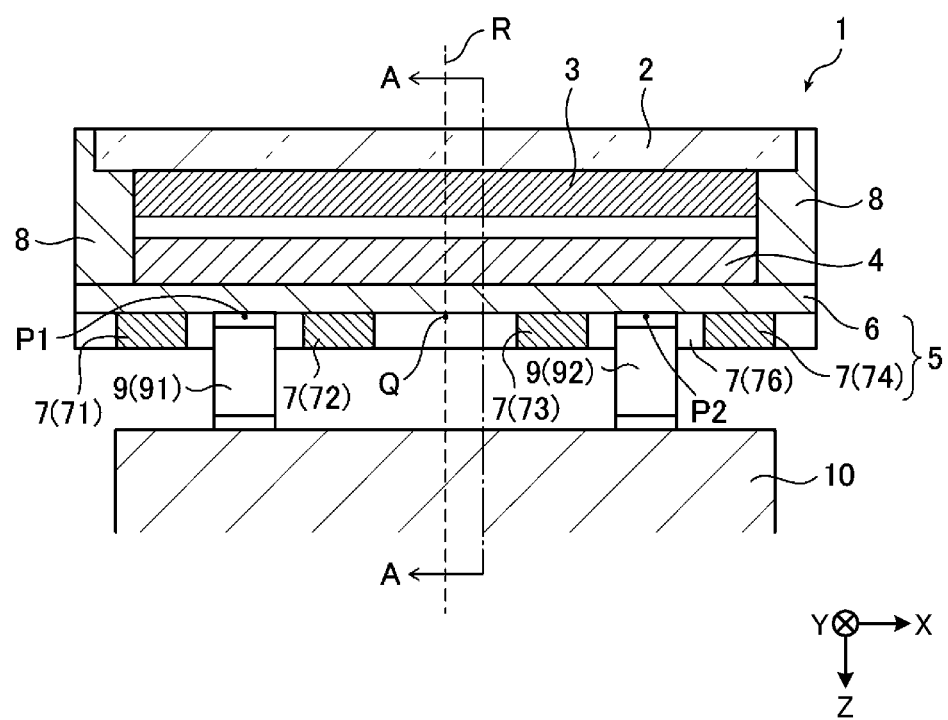
FIG. 1 is a cross-sectional view illustrating an in-vehicle display device.

A numerical range represented by using "to" includes numerical values described before and after "to" as a lower limit value and an upper limit value.

Hereinafter, an embodiment of the present invention will be described with reference to the drawings. However, the present invention is not limited to the following embodiment. Various modifications and substitutions can be made in the following embodiment without departing from the scope of the present invention.

An in-vehicle display device according to the embodiment of the present invention is an in-vehicle display device having n layers from a cover glass to a housing bottom member and including at least a display panel midway in the n layers thereof. A member of each layer includes only a plate-shaped member, or includes the plate-shaped member and a rib. The housing bottom member is fixed to an interior portion of a vehicle at at least two fixing points. When a virtual plane passing through an intermediate point between the two fixing points and perpendicular to a line connecting the two fixing points is defined as a virtual plane R, a length of an intersection line between a main surface of the cover glass and the virtual plane R is defined as a distance $Z_{cg}$, and a length on an intersection line between a main surface of the display panel and the virtual plane R from an upper end to a point corresponding to the intermediate point is defined as a distance Z, a ratio $Z/Z_{cg}$ of the distance Z to the distance $Z_{cg}$ is 0.6 or less. The n layers from the cover glass to the housing bottom member on a virtual line L passing through a 5 mm lower end side from the upper end of the intersection line between the main surface of the display panel and the virtual plane R in a thickness direction of the in-vehicle display device satisfy the following Expression (1).

Alternatively, an in-vehicle display device according to the embodiment of the present invention is an in-vehicle display device having n layers from a cover glass to a housing bottom member and including at least a display panel midway in the n layers thereof. A member of each layer includes only a plate-shaped member, or includes the plate-shaped member and a rib. The housing bottom member is fixed to an interior portion of a vehicle at one fixing point. When a virtual plane passing through the fixing point and including a thickness direction and a vertical direction of the cover glass at the fixing point is defined as a virtual plane R, a length of an intersection line between a main surface of the cover glass and the virtual plane R is defined as a distance $Z_{cg}$, and a length on an intersection line between a main surface of the display panel and the virtual plane R from an upper end to a point corresponding to the fixing point is defined as a distance Z, a ratio $Z/Z_{cg}$ of the distance Z to the distance $Z_{cg}$ is 0.6 or less. The n layers from the cover glass to the housing bottom member on a virtual line L passing through a 5 mm lower end side from the upper end of the intersection line between the main surface of the display panel and the virtual plane R in a thickness direction of the in-vehicle display device satisfy the following Expression (1).

FIG. 1 is a cross-sectional view illustrating an in-vehicle display device 1. Hereinafter, the "in-vehicle display device" may be simply referred to as a "display device".

Figure 2:
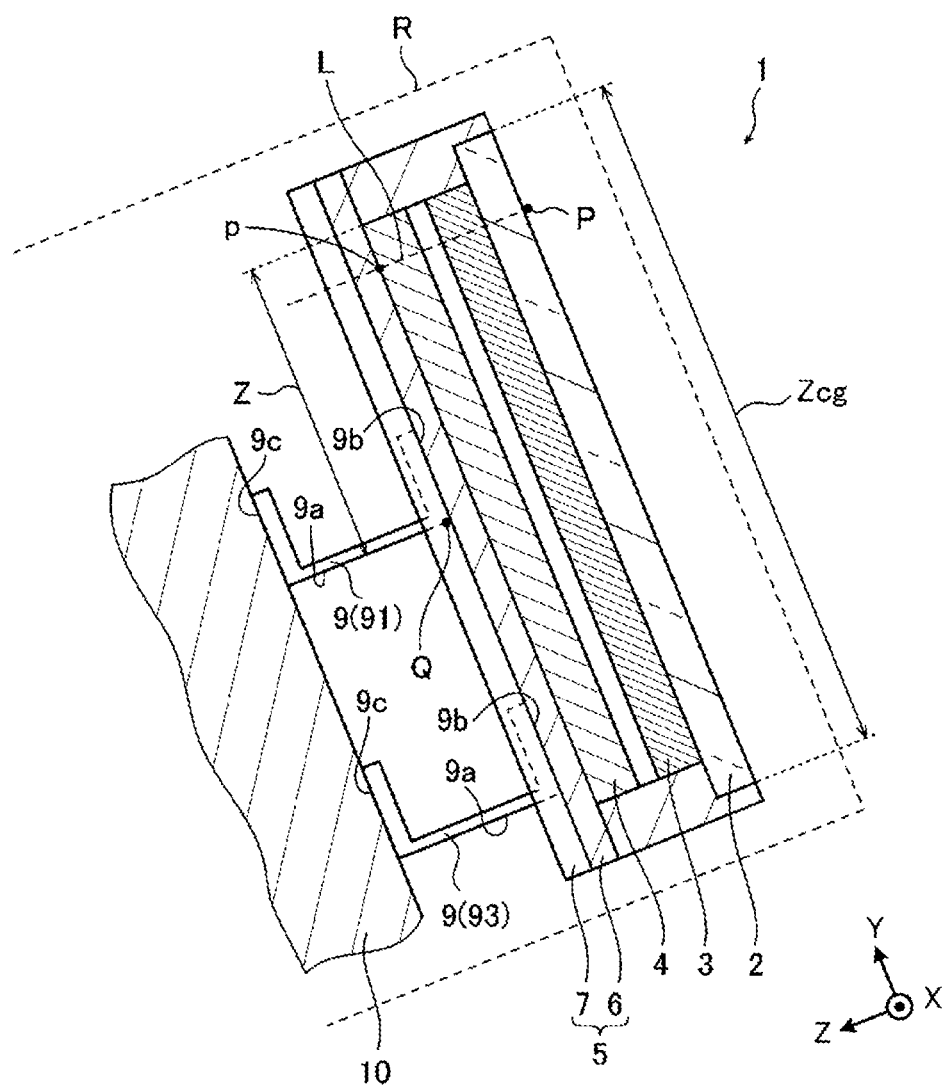
FIG. 2 is a cross-sectional view taken along a line A-A in FIG. 1.

FIG. 2 is a cross-sectional view taken along a line A-A in FIG. 1. In FIG. 2, illustration of the rib 7 (rib 75, rib 76, and rib 77) in a lateral direction to be described later is omitted.

As will be described later, the in-vehicle display device 1 is an in-dash type or on-dash type in-vehicle display device.

The in-vehicle display device 1 is, for example, a car navigation device, and may be another display device mounted in a vehicle, such as a display audio device.

<Basic Composition>

The in-vehicle display device 1 includes a display panel 3 such as a liquid crystal panel, and a cover glass 2.

The display panel 3 is attached to the cover glass 2 with an adhesive layer (not illustrated).

The adhesive layer is, for example, an optical clear adhesive (OCA) film or an OCA tape, and the thickness thereof is, for example, 5 to 400 μm, and preferably 50 to 200 μm.

The in-vehicle display device 1 further includes a housing bottom member 5 and a housing side wall 8, which constitute a housing of the in-vehicle display device 1. A backlight unit 4, which is required in the case where the display panel 3 is a liquid crystal panel, is disposed on the housing bottom member 5. Hereinafter, the "housing bottom member" may be simply referred to as a "bottom member".

As described above, the in-vehicle display device according to the embodiment of the present invention has a configuration in which the n layers from the cover glass to the housing bottom member are stacked. The in-vehicle display device according to the embodiment of the present invention has the n layers from the cover glass to the housing bottom member, and includes at least the display panel midway in the n layers thereof. In other words, the in-vehicle display device according to the embodiment of the present invention has a stacked structure of the n layers including the housing bottom member, the display panel, and the cover glass in this order, in which the first layer is the cover glass, and the n-th layer is the housing bottom member.

n is an integer of 3 or more, and preferably 4 or more. On the other hand, n is preferably 15 or less, and more preferably 12 or less.

For example, in the case of the in-vehicle display device 1 illustrated in FIGS. 1 and 2, four layers, i.e., the cover glass 2 (first layer), the display panel 3 (second layer), the backlight unit 4 (third layer), and the housing bottom member 5 (fourth layer) are stacked in this order.

Actually, the adhesive layer is present between the cover glass 2 (first layer) and the display panel 3 (second layer), and handling of the adhesive layer will be described later.

The in-vehicle display device 1 may not include the backlight unit 4.

Specifically, for example, the in-vehicle display device 1 may have a configuration in which three layers, i.e., the cover glass 2 (first layer), the display panel 3 (second layer), and the housing bottom member 5 (third layer) are stacked in this order.

In this case, an organic EL panel or the like that does not require the backlight unit 4 is selected as the display panel 3.

The member of each layer in the in-vehicle display device according to the embodiment of the present invention includes only a plate-shaped member, or includes a plate-shaped member and a rib.

In the embodiment to be described later, a case in which the member including a plate-shaped member and ribs is limited to the housing bottom member will be described as an example.

In the case where a member different from the housing bottom member includes a plate-shaped member and ribs, the member may be handled in the same manner as the housing bottom member to be described below.

The housing bottom member 5 includes a housing bottom plate 6 which is a plate-shaped member. A plurality of ribs 7 are provided on a surface of the housing bottom plate 6 opposite to the cover glass 2. The rib 7 is, for example, a quadrangular prism member. By forming the housing bottom member 5 into a shape having the rib 7, it is possible to reduce a weight of the in-vehicle display device 1 as compared with the case in which the housing bottom member 5 is formed into a thick plate shape having no rib 7. The rib 7 may have a curved shape instead of a linear shape.

Figure 3:
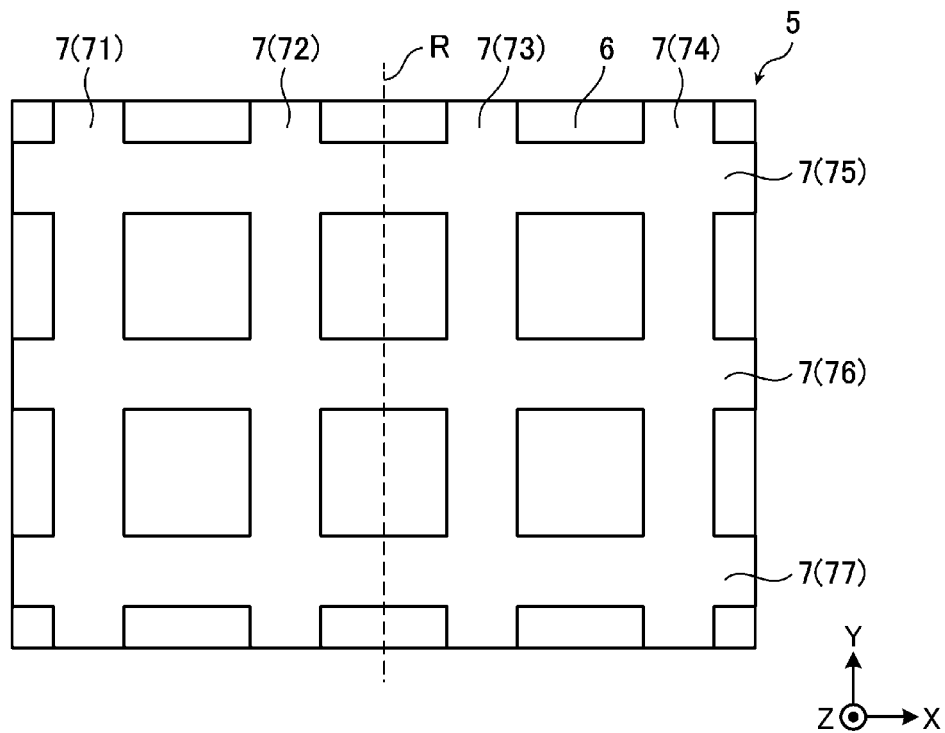
FIG. 3 is a schematic diagram of a housing bottom member as viewed from a rib side.

FIG. 3 is a schematic diagram of the housing bottom member 5 as viewed from a rib 7 side. In FIG. 3, illustration of a bracket 9 or the like to be described later is omitted.

As illustrated in FIG. 3, the plurality of ribs 7 are provided in a grid shape on the housing bottom member 5 of the present embodiment. Specifically, the plurality of ribs 7 extending in an up-down direction in FIG. 3, i.e., a rib 71, a rib 72, a rib 73, and a rib 74 intersect the plurality of ribs 7 extending in a left-right direction in FIG. 3, i.e., the rib 75, the rib 76, and the rib 77. The shape of the ribs 7 is not limited to FIG. 3 and may be any shape, and may be, for example, a curved shape instead of a linear shape, or may not be provided in a grid shape.

The housing bottom member 5 may not have the rib 7. In this case, the housing bottom member 5 includes only the housing bottom plate 6.

The housing bottom member 5 may be integrated with the housing side wall 8. The housing bottom member 5 may be formed by a method such as die casting or press molding.

<Fixing to Interior Portion of Vehicle>

Next, with reference to FIG. 4 in addition to FIGS. 1 to 3, the fixing of the In-vehicle display device 1 (housing bottom member 5) to an interior portion 10 of a vehicle will be described. Hereinafter, the "interior portion of the vehicle" may be simply referred to as an "interior portion". The interior portion 10 is, for example, a part of a dashboard of the vehicle.

Figure 4:
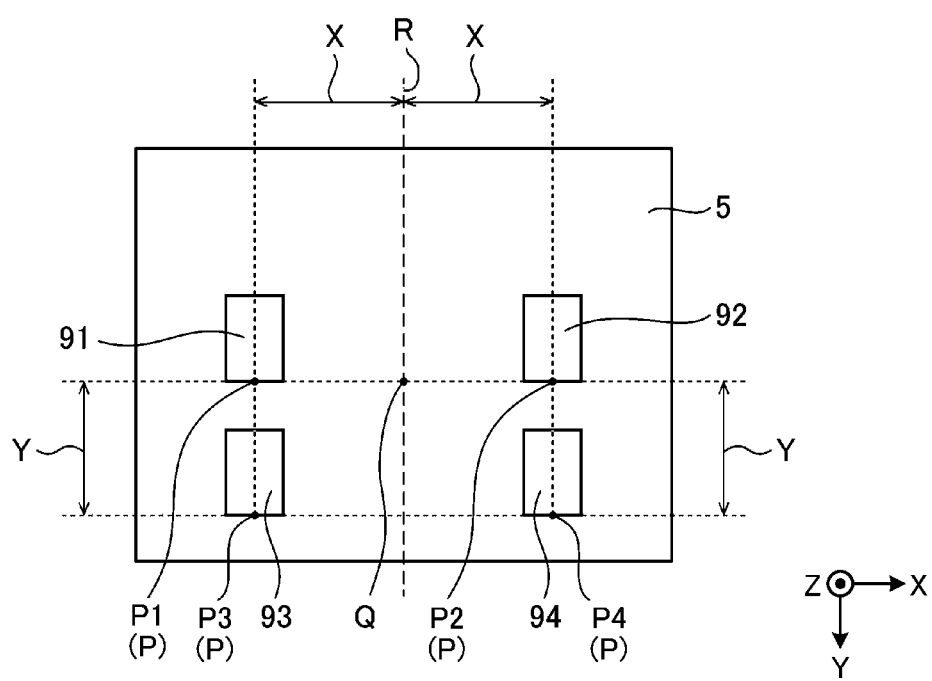
FIG. 4 is a schematic diagram illustrating an arrangement state of brackets.

FIG. 4 is a schematic diagram illustrating an arrangement state of the brackets 9, and is a view of the in-vehicle display device 1 (housing bottom member 5) viewed from an interior portion 10 (not illustrated in FIG. 4) side. In FIG. 4, illustration of the rib 7 or the like is omitted.

The housing bottom member 5 is fixed to the interior portion 10 of the vehicle at fixing points (fixing points P1 to P4) on a rear surface side (side opposite to the cover glass 2). That is, in FIG. 4, the fixing points P are formed on a main surface of the bottom member 5 on a Z-direction side (hereinafter, may be simply referred to as "main surface of bottom member 5"). The number of fixing points P is four in the example of FIG. 4, and may be any. The fixing points P (fixing points P1 to P4) are portions of the bottom member 5 serving as interfaces to be fixed to the vehicle (to the interior portion 10 in the present embodiment), and are portions to which the brackets 9 to be described later can be attached in the present embodiment. The X direction, Y direction, and Z direction in the following description of the fixing points P can be defined as follows. That is, as illustrated in FIGS. 1 to 4, a direction that is a thickness direction of the display device 1 from a display surface to a back surface is defined as the Z direction. In the state in which the display device 1 is attached to the vehicle, a direction (right direction in the example of FIG. 1) orthogonal to the Z direction and toward one orientation along a horizontal plane is defined as the X direction. Among directions orthogonal to the Z direction and the X direction, an upward direction in a vertical direction is defined as the Y direction. As for the Z direction, the X direction, and the Y direction, the "direction" is used as a concept having an orientation. That is, the term "Z direction" refers to the orientation determined above, and the term "direction opposite to the Z direction" refers to an orientation opposite to the orientation determined above.

The bottom member 5 is fixed to the brackets 9 in a state in which the main surface on the Z-direction side is in contact with fixing members (here, brackets 9). When a region of the main surface of the bottom member 5 that is in contact with the fixing members is referred to as a contact region, the fixing points P can be said to be points on the contact region. The fixing points P may be any position on the contact region. For example, in FIG. 4, the fixing point P (fixing points P1 to P4) is exemplified as a midpoint position in the X direction of the side located on the Y-direction side among sides of each contact region. Alternatively, the fixing point P (fixing points P1 to P4) may be, for example, a midpoint position in the X direction of the side located on a direction opposite to the Y direction among the sides of the contact region. It can be said that one fixing point P is formed for each contact region. That is, it can be said that in the case where there are a plurality of fixing points P, a plurality of contact regions are formed at separate positions, and one fixing point is formed in each contact region. It can be said that in the case where there is one fixing point P, there is also one contact region.

For example, in the case where the in-vehicle display device 1 (housing bottom member 5) is fixed to the brackets 9, a position overlapping a midpoint of one side of an end of a convex surface 9a of the bracket 9 in the main surface of the bottom member 5 (that is, midpoint in the X direction of the side opposite to the Y direction of the contact region in the embodiment illustrated in FIGS. 1 to 4) may be set as the fixing point P. In addition, in the case where the bottom member 5 is fixed to the brackets 9 with fixtures such as bolts, the fixing point P may be a portion of the main surface of the bottom member 5 in which a hole (for example, a bolt hole) into which the fixture is inserted is opened. Alternatively, in the case where the bottom member 5 is fixed to the bracket 9 with a plurality of fixtures per contact region, the fixing point P may be a central position between portions in which holes (for example, bolt holes) into which the fixtures are inserted are opened. For example, in the case where the bottom member 5 is fixed to the brackets 9 with an adhesive or the like, the fixing point P may be a point on the contact region to which the adhesive is applied on the main surface of the bottom member 5. For example, the bottom member 5 may be fixed to the vehicle by forming a protrusion on the main surface of the bottom member 5 and inserting the protrusion into a recess formed in the vehicle (interior portion 10 in the present embodiment). In this case, the protrusion of the bottom member 5 may be regarded as the bracket 9 without separately providing the bracket 9. In this case, a surface on the Z-direction side of the protrusion of the bottom member 5 is a contact region, and a point on the contact region may be the fixing point P. Alternatively, for example, the bottom member 5 may be fixed to the vehicle by forming a recess in the main surface of the bottom member 5, and inserting a protrusion formed on the vehicle (interior portion 10 in the present embodiment) into the recess in the main surface of the bottom member 5. In this case, the protrusion of the vehicle may be regarded as the bracket 9 without separately providing the bracket 9. In this case, a surface on the Z-direction side of the recess of the bottom member 5 is a contact region, and a point on the contact region may be the fixing point P. The position of the fixing point P or the like will be described later.

In the example of FIG. 4, the fixing points P1 and P2 are arranged along a width direction of the vehicle. The same applies to the fixing point P3 and the fixing point P4. A line passing through the fixing point P1 and the fixing point P2 and a line passing through the fixing point P3 and the fixing point P4 are parallel to each other, and the four points form a rectangle.

As illustrated in FIGS. 1 to 4, the brackets 9 (brackets 91 to 94) as the fixing members may be attached to the fixing points (fixing points P1 to P4). In this case, the housing bottom member 5 is fixed to the interior portion 10 via the brackets 9.

The bracket 9 is an elongated plate-shaped member, and is bent in a U shape. The bracket 9 may be bent in an S shape.

For example, a center of the bracket 9 in a plate width direction is positioned at the fixing point (fixing points P1 to P4). In the bracket 9, one side of the end of the convex surface 9a (lower surface in FIG. 2) formed by being bent in the U shape is in contact with the fixing point (fixing points P1 or fixing point P2). In the embodiment illustrated in FIGS. 1 to 4, a direction perpendicular to the convex surface 9a of the bracket 9 perpendicularly intersects the width direction of the vehicle.

In the embodiment illustrated in FIGS. 1 to 4, the bracket 9 includes the convex surface 9a formed by being bent in the U shape, one surface 9b connected to the convex surface 9a, and another surface 9c connected to the convex surface 9a. The one surface 9b and the other surface 9c are formed substantially perpendicular to the convex surface 9a. In addition, in the embodiment illustrated in FIGS. 1 to 4, in the bracket 9, the one surface 9b connected to the convex surface 9a is in contact with the housing bottom member 5, and the other surface 9c connected to the convex surface 9a is in contact with the interior portion 10.

The bracket 9 is fixed to the housing bottom member 5 and the interior portion 10 with a fixture such as a screw (not illustrated).

FIG. 4 illustrates an intermediate point Q between the fixing point P1 and the fixing point P2.

A distance between the intermediate point Q and the fixing point P1 or a distance between the intermediate point Q and the fixing point P2 is defined as a distance X.

The distance X is preferably 30 to 200 mm, and more preferably 50 to 130 mm from the viewpoint of optimizing vibration characteristics (JIS D 1601 automobile part vibration test method).

A distance between the fixing point P1 and the fixing point P3 arranged in an up-down direction in FIG. 4, or a distance between the fixing point P2 and the fixing point P4 is defined as a distance Y.

The distance Y is preferably 30 to 200 mm, and more preferably 35 to 125 mm for the same reason as the distance X.

In the embodiment of the present invention, two fixing points are selected from the top, that is, from the Y-direction side, among the fixing points set on the housing bottom member 5, and a midpoint thereof is used as the intermediate point Q.

For example, FIGS. 1 to 4 illustrate an aspect in which the housing bottom member 5 is fixed to the interior portion 10 at four fixing points (fixing points P1 to P4), two each on the upper and lower sides.

As illustrated in FIGS. 1 to 4, in the case where there are a plurality of upper and lower fixing points, the two uppermost fixing points (fixing points P1 and P2 in FIGS. 1 to 4) are used as the fixing points for defining the intermediate point Q (and virtual plane R to be described later).

In the case where there are three or more fixing points on a line having the same height, that is, the same position in the Y direction, two fixing points having the smallest interval between the fixing points are selected, and a midpoint thereof is set as the intermediate point Q.

In the case where there are three or more fixing points at equal intervals at the same height, a midpoint of two fixing points of any combination of two fixing points having the smallest interval may be set as the intermediate point Q. That is, in the case where there are a plurality of candidates for the intermediate point Q (and virtual plane R and virtual line L to be described later), any one of the candidates may satisfy requirements of the present invention.

The housing bottom member 5 may be fixed to the interior portion 10 at three points.

For example, when explained with reference to FIG. 4, assumed can be a case where there is no fixing point P1 and fixing point P2, and instead another fixing point P' (not illustrated in FIG. 4 or the like) is present on the line connecting the fixing point P1 and the fixing point P2. In this case, the housing bottom member 5 is fixed to the interior portion 10 at three points, i.e., the fixing point P3, the fixing point P4, and the fixing point P'.

At this time, in the case where there is no difference in height between the fixing point P3 and the fixing point P4, a point closer to the fixing point P' is selected, and a midpoint between the selected point and the fixing point P' is set as the intermediate point Q. In the case where there is no difference in distance between any one fixing point and the fixing point P', any one fixing point is selected, and a midpoint between the selected point and the fixing point P' is set as the intermediate point Q.

The housing bottom member 5 may be fixed to the interior portion 10 only at one fixing point (referred to as a "fixing point P'''" for convenience). That is, the bracket 9 may be disposed only at the fixing point P''', and the housing bottom member 5 may be fixed to the interior portion 10 by using the bracket 9.

In this case, a virtual plane perpendicular to a side of the convex surface 9a of the bracket 9 disposed at the fixing point P''', which is in contact with the housing bottom member 5, is defined as the virtual plane R to be described later.

The housing bottom member 5 may be fixed to the interior portion 10 by, for example, deforming a part of the housing bottom member 5 without using the bracket 9. Alternatively, a part of the interior portion 10 may be deformed and fixed to the housing bottom member 5. In this case, each fixing point may be defined as a center of each fixing portion.

As long as the above-described fixing condition is satisfied, a part of the housing side wall 8 may be deformed and fixed to the interior portion 10. Alternatively, a part of the interior portion 10 may be deformed and fixed to the housing side wall 8.

<Ratio $Z/Z_{cg}$>

FIGS. 1 to 4 illustrate the virtual plane R passing through the intermediate point Q and perpendicular to the line connecting the fixing point P1 and the fixing point P2 (two fixing points P used to define the intermediate point Q). As described above, in the case where the housing bottom member 5 is fixed to the interior portion 10 only at one fixing point P''' by using the bracket 9, the virtual plane R can also be said to be a virtual plane perpendicular to the side of the convex surface 9a of the bracket 9, which is in contact with the housing bottom member 5, and a virtual plane passing through the fixing point P''' and including a thickness direction and a vertical direction of the cover glass 2 at the fixing point P'. In other words, in a mode in which the intermediate point Q is provided, the virtual plane R can be defined as a YZ plane including the intermediate point Q. In addition, in the case where the housing bottom member 5 is fixed to the interior portion 10 at only the one fixing point P''', the virtual plane R can be defined as a YZ plane including the fixing point P'''.

Here, reference is made to FIG. 2. A length of an intersection line between a main surface of the cover glass 2 and the virtual plane R is defined as a distance $Z_{cg}$. Further, a length on an intersection line between a main surface of the display panel 3 and the virtual plane R from an upper end (end on the Y-direction side) to a point corresponding to the intermediate point Q is defined as a distance Z. In the case where the housing bottom member 5 is fixed to the interior portion 10 at only the one fixing point P''', the "point corresponding to the intermediate point Q" is read as a "point corresponding to the fixing point P'''". That is, a length on the intersection line between the main surface of the display panel 3 and the virtual plane R from the upper end (end on the Y-direction side) to the point corresponding to the fixing point P''' is defined as the distance Z. Regarding the distance Z, a direction from a center of the display panel 3 toward the outside of the display panel 3 is defined as a positive direction, and a direction from the outside of the display panel toward the center of the display panel 3 is defined as a negative direction.

The "point corresponding to the intermediate point Q" or the "point corresponding to the fixing point P'''" is a point positioned on the main surface of the display panel 3 by moving the intermediate point Q or the fixing point P''' in a thickness direction (up-down direction in FIG. 1) of the in-vehicle display device 1.

In the present application, the case in which the ratio $Z/Z_{cg}$ of the distance Z to the distance $Z_{cg}$ exceeds 0.6 is defined as a standing type. On the other hand, the case in which the ratio $Z/Z_{cg}$ of the distance Z to the distance $Z_{cg}$ is 0.6 or less is defined as the in-dash type or the on-dash type.

The in-vehicle display device 1 has the ratio $Z/Z_{cg}$ of the distance Z to the distance $Z_{cg}$ of 0.6 or less, and is of the in-dash type or the on-dash type (hereinafter, also simply referred to as the "in-dash type").

<Expressions (1) to (4)>

In order for the cover glass to exhibit good impact resistance, as described above, the in-dash type in-vehicle display device 1 may be insufficient to satisfy only the "Expression (I)" described in Patent Literature 1. Further, it is necessary to consider a shape of the housing bottom member 5 which may have the rib 7.

Here, FIG. 2 illustrates the virtual line L that passes through a 5 mm lower end side from the upper end of the intersection line between the main surface of the display panel 3 and the virtual plane R in the thickness direction of the in-vehicle display device 1. The virtual line L is perpendicular to a surface (main surface) of the cover glass 2.

A point on the main surface of the cover glass 2 through which the virtual line L passes is defined as a hitting point P. The head impact test to be described later is a test in which an impactor collides with the hitting point P to evaluate the impact resistance or the like of the cover glass 2.

The present inventors found that the cover glass has excellent impact resistance when an n-layer stacked body from the cover glass to the housing bottom member satisfies the following Expression (1) on the virtual line L.

[Math. 1]

$$S > \left( \frac{1}{0.021 \times t_1^2 + 0.068} - t_1^2 \right) \times E_1 \quad (1)$$

In Expression (1),
- $E_1$: Young's modulus of the cover glass (unit: GPa),
- $t_1$: thickness of the cover glass (unit: mm), and
- S is represented by the following Expression (2).

It can be said that the S value obtained by the following Expression (2) indicates a rigidity of the stacked body formed of each member (each layer) on the virtual line L. The hitting point P is a position in which the impact resistance tends to be weak in the in-vehicle display device 1. In the case where the rigidity of the stacked body on the virtual line L passing through the hitting point P is within the above range, the deformation of the cover glass 2 is suppressed, and a stress generated by an impact does not exceed a glass breaking stress, and thus the impact resistance of the cover glass 2 is excellent.

[Math. 2]

$$S = E_2 \cdot t_2^2 + \ldots + E_n \cdot t_n^2 \quad (2)$$

In Expression (2),
- $E_2$: Young's modulus of the second layer (unit: GPa),
- $t_2$: thickness of the second layer (unit: mm),
- $E_n$: Young's modulus of the n-th layer (housing bottom member in the present embodiment) (unit: GPa),
- $t_n$: thickness of the n-th layer (housing bottom member in the present embodiment) (unit: mm), and
- a thickness $t_k$ of any k-th layer among the 1 to n layers including the $t_1$, the $t_2$, and the $t_n$ is represented by the following Expression (3).

[Math. 3]

$$t_k = \sqrt[3]{a^3 + \frac{w_2}{w_1} h^3 + 12a\left(b - \frac{a}{2}\right)^2 + 12\frac{w_2}{w_1} h\left(\frac{h}{2} + a - b\right)^2} \quad (3)$$

In Expression (3),
- a: thickness of a plate-shaped member of the k-th layer (when k=n, housing bottom plate of housing bottom member in the present embodiment) (unit: mm),
- $w_2$: width of a rib Rb1 closest to a point p on the plate-shaped member of the k-th layer (when k=n, on the housing bottom plate of the housing bottom member in the present embodiment) through which the virtual line L passes, among the ribs (unit: mm),
- $w_1$: distance between the rib Rb1 and a rib Rb2 (unit: mm), and
- h: thickness of the rib Rb1 and the rib Rb2 (unit: mm).

As described above, a case in which the member including the plate-shaped member and the rib is limited to the housing bottom member is exemplified in the present embodiment. Therefore, for example, when k=n, that is, when the plate-shaped member and the rib on the housing bottom member are described, as illustrated in FIGS. 5 to 9, the rib Rb1 is the rib 7 closest to the point p on a main surface 6B (main surface on a side in which the rib 7 is provided) of the housing bottom plate 6 through which the virtual line L passes among the ribs 7 of the bottom member 5. The rib Rb2 is the rib 7 that is located on a line connecting the point p on the housing bottom plate 6 through which the virtual line L passes and the rib Rb1 and is closest to the rib Rb1. In other words, the rib Rb2 is a rib located in an extending direction of a line passing through the point p on the housing bottom plate 6 through which the virtual line L passes and perpendicular to a center line of the rib Rb1.

In addition, the width of the rib Rb1 refers to the width of the rib Rb1 when viewed from an extending direction of the rib Rb1. Further, the distance between the rib Rb1 and the rib Rb2 refers to a distance between a central axis of the rib Rb1 and a central axis of the rib Rb2 when viewed from the extending direction of the rib Rb1. Furthermore, the distance between the rib Rb1 and the rib Rb2 can be said to be a distance between the rib Rb1 (rib 72) and the rib Rb2 (rib 73) (distance between the center lines) on a perpendicular line of the rib Rb1 (rib 72) passing through the point p. In addition, in the case where the rib Rb1 and the rib Rb2 have different thicknesses in the Z direction, the h may be an average value of the thicknesses of the rib Rb1 and the rib Rb2 in the Z direction.

In Expression (3), the b is represented by the following Expression (4).

[Math. 4]

$$b = \frac{0.5 w_1 \cdot a^2 + 0.5 w_2 \cdot h^2 + w_2 \cdot a \cdot h}{w_1 \cdot a + w_2 \cdot h} \quad (4)$$

Since the member of each layer including the housing bottom member may not have a rib, the h is a number including 0, that is, a number of 0 or more.

In the case where the member of the k-th layer does not have a rib, h=0, and thus for the thickness $t_k$, $t_k$=a is calculated based on Expressions (3) and (4).

That is, in the present embodiment, the first layer (only the cover glass which is the plate-shaped member) and the second layer (only the display panel which is the plate-shaped member) have no rib, and thus the thicknesses thereof are the thicknesses of the cover glass itself and the display panel itself, which are the plate-shaped members, respectively.

Alternatively, for example, in the case where the first layer and/or the second layer have a rib, the respective thicknesses $t_1$ and/or $t_2$ are calculated based on the expressions (3) and (4).

Figure 5:
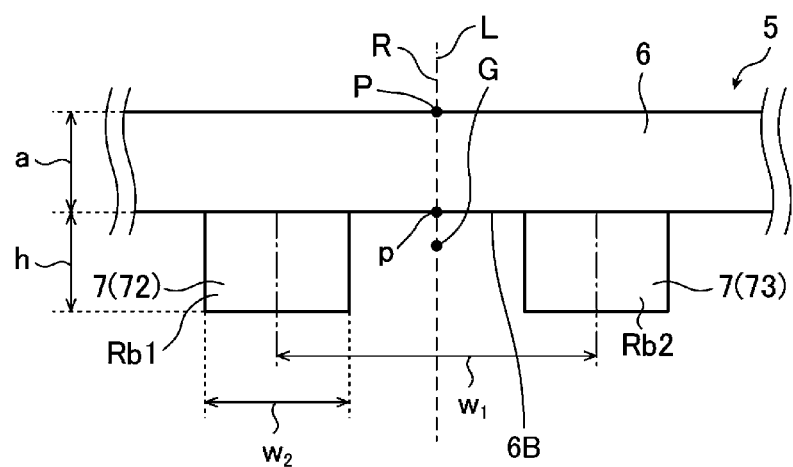
FIG. 5 is a cross-sectional view illustrating the housing bottom member.

FIG. 5 is a cross-sectional view illustrating the housing bottom member 5, and is also an enlarged view of FIG. 1.

Figure 6:
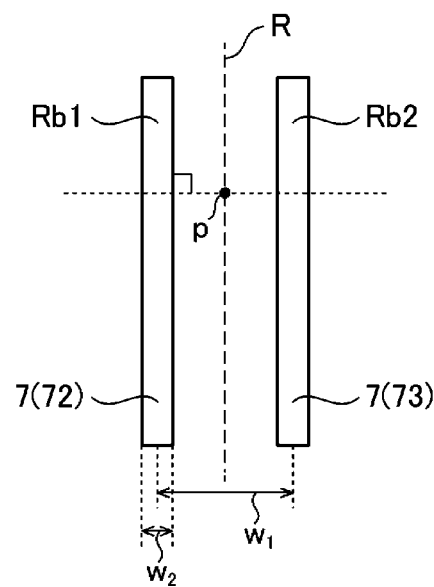
FIG. 6 is a plan view schematically illustrating ribs in FIG. 5.

FIG. 6 is a plan view schematically illustrating the ribs 7 (ribs 72 and 73) in FIG. 5, and is also a view of the housing bottom plate 6 (not illustrated in FIG. 6) viewed from the rib 7 side.

FIGS. 5 and 6 illustrate the a, the h, the $w_1$, the $w_2$, and the point p (a and h are illustrated only in FIG. 5). The point p is a point on the housing bottom plate 6 corresponding to the hitting point P of the cover glass 2, and the point p and the hitting point P are located on the virtual line L.

In FIG. 5, the b is a distance from the surface (surface on a cover glass 2 side) of the housing bottom plate 6 to a center G (center in FIG. 5 which is the cross-sectional view of the housing bottom member 5).

In FIGS. 5 and 6, since both the ribs 72 and 73 are at equal distances from the point p, the rib Rb1 may be either the rib 72 or the rib 73. However, for convenience, in FIGS. 5 and 6, the rib 72 is referred to as the rib Rb1.

It can be seen from FIGS. 5 and 6 that the $w_2$ is the width of the rib Rb1 closest to the point p. Further, it can be seen that the $w_1$ is the distance between the rib Rb1 and the rib Rb2 (distance between the center lines of the rib Rb1 and the rib Rb2).

In Expressions (3) and (4), the thickness ($t_n$) of the housing bottom member which is the n-th layer (thickness $t_k$ of the k-th layer) is obtained such that a moment of inertia of area is the same as that of the housing bottom member having no rib.

Figure 7:
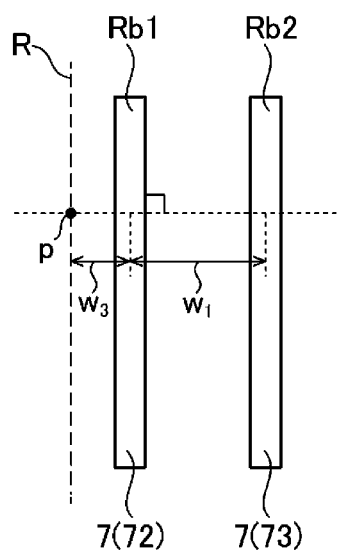
FIG. 7 is a schematic diagram illustrating the ribs in the case where a position of a point p is different from that in FIG. 6.

FIG. 7 is a schematic diagram illustrating the ribs 7 (ribs 72 and 73) in the case where a position of the point p is different from that in FIG. 6.

In FIG. 7, the point p (point corresponding to the hitting point P) is located outside (left side) of the rib 72 rather than between the ribs 72 and 73. In FIG. 7, the rib 72 closest to the point p is the rib Rb1, and the rib 73 located on the line connecting the point p and the rib Rb1 is the rib Rb2.

The width $w_2$ of the rib Rb1 and the distance $w_1$ between the rib Rb1 and the rib Rb2 are obtained. Further, a distance $w_3$ between the point p and the rib Rb1 (distance from the point p to the center line of the rib Rb1) is also obtained.

In the case where the distance $w_1$ is equal to or greater than the distance $w_3$ ($w_1 \geq w_3$), Expressions (3) and (4) are calculated by using values of the $w_1$ and the $w_2$ to obtain a value of $t_n$ ($t_k$).

However, in the case where the distance $w_3$ is greater than the distance $w_1$ ($w_3 > w_1$), Expressions (3) and (4) are calculated with an assumption of having no rib 7 without applying the values of the $w_1$ and the $w_2$.

Figure 8:
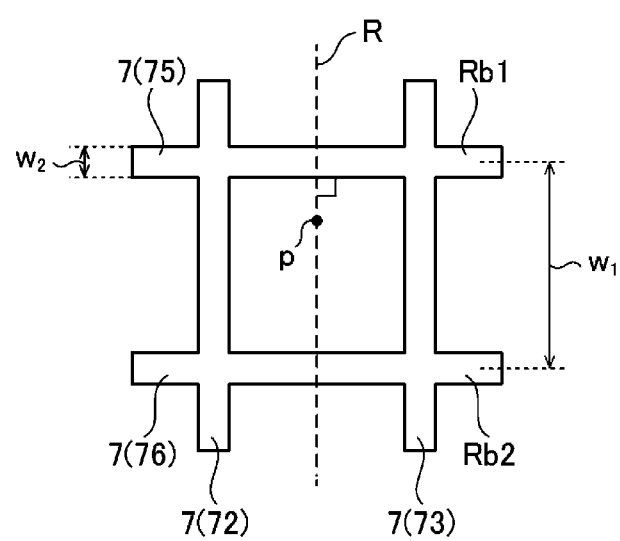
FIG. 8 is a schematic diagram illustrating ribs in a lateral direction in addition to ribs in a longitudinal direction.

FIG. 8 is a schematic diagram illustrating the ribs 7 (ribs 75 and 76) in the lateral direction in addition to the ribs 7 (ribs 72 and 73) in a longitudinal direction.

In FIG. 8, the rib Rb1 closest to the point p is the rib 75 in the lateral direction. The rib Rb2 located on the line connecting the point p and the rib Rb1 is the rib 76 parallel to the rib 75.

As described above, even in the case where there are the plurality of ribs 7 (for example, see FIG. 3), only the rib Rb1 closest to the point p (and rib Rb2 corresponding thereto) may be considered.

In the case where there are a plurality of ribs Rb1 having the same distance from the point p, a relation between the distance $w_1$ and the distance $w_3$ is examined for all the ribs Rb1.

If the distance $w_1$ is equal to or greater than the distance $w_3$ ($w_1 \geq w_3$) in any one of the ribs Rb1, Expressions (3) and (4) are calculated by using the values of the $w_1$ and the $w_2$ related to the rib Rb1 to obtain the value of $t_n$ ($t_k$).

Figure 9:
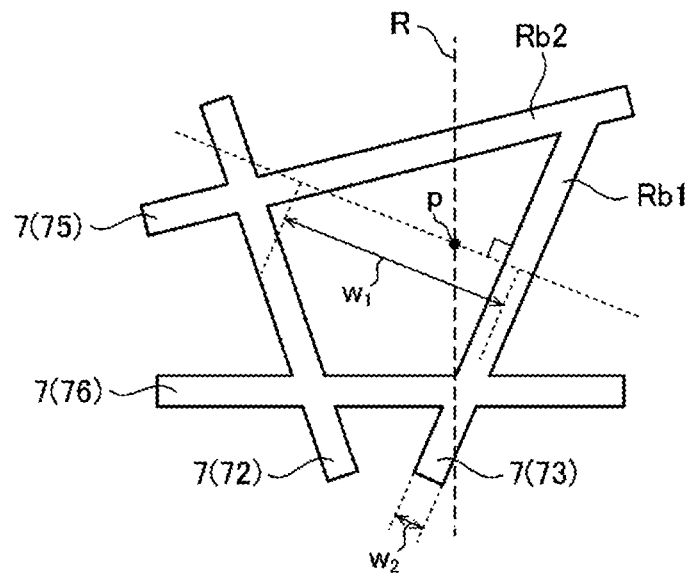
FIG. 9 is a schematic diagram illustrating a state in which the ribs disposed are not parallel to each other.

FIG. 9 is a schematic diagram illustrating a state in which the ribs 7 disposed are not parallel to each other. That is, in FIG. 9, the ribs 72 and 73 in the longitudinal direction are not parallel to each other, and the ribs 75 and 76 in the lateral direction are not parallel to each other.

In FIG. 9, the rib Rb1 closest to the point p is the rib 73. The rib Rb2 located on the line connecting the point p and the rib Rb1 (rib 73) is the rib 75 instead of the rib 72.

The width $w_2$ of the rib Rb1 (rib 73) and the distance (distance between center lines) $w_1$ between the rib Rb1 (rib 73) and the rib Rb2 (rib 75) on a perpendicular line of the rib Rb1 (rib 73) passing through the point p are obtained.

As described above, a shape formed by crossing the plurality of ribs 7 may not be a square (rectangular shape) with four right-angled corners, and may be a square other than a rectangular shape, or other polygons.

Even in this case, the values of the $w_1$ and the $w_2$ necessary for the calculation of Expressions (3) and (4) can be determined according to the above-described definition.

A cross-sectional shape of the rib 7 is, for example, rectangular or trapezoidal.

Figure 13:
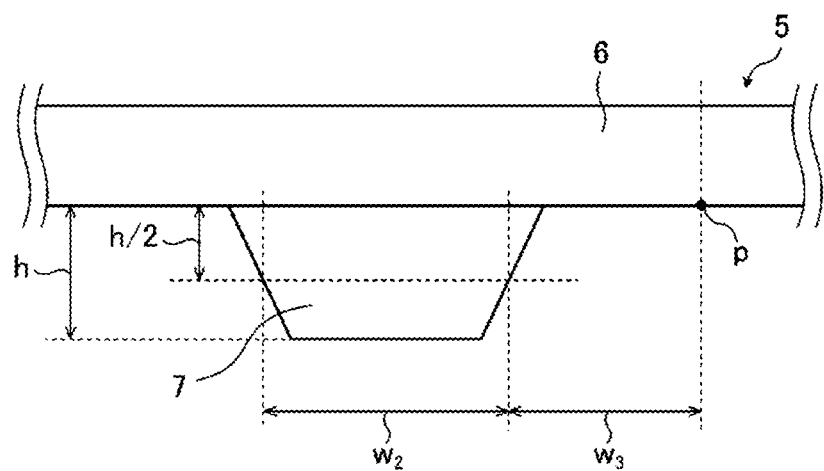
FIG. 13 is a schematic diagram illustrating the rib having a trapezoidal cross-sectional shape.

FIG. 13 is a schematic diagram illustrating the rib 7 having a trapezoidal cross-sectional shape. As illustrated in FIG. 13, values of the $w_2$ and the $w_3$ are measured at a height of h/2 from the surface (surface on a side in which the rib 7 is provided) of the housing bottom plate 6 of the housing bottom member 5.

It is demonstrated in [Examples] to be described later that the impact resistance of the cover glass is excellent in the case where Expression (1) is satisfied.

That is, the [Examples] show that in the case where Expression (1) is not satisfied (Comparative Examples), a stress generated in the cover glass is greater than a breaking generation threshold, whereas in the case where Expression (1) is satisfied (Examples), the stress generated in the cover glass is smaller than the breaking generation threshold.

Further, in the case where the following Expression (4A) is satisfied, the stress generated in the cover glass is further reduced, and thus a breaking generation frequency can be further reduced, which is more preferred.

[Math. 5]

$$S \geq \left( \frac{1}{0.021 \times t_1^2 + 0.068} - t_1^2 \right) \times E_1 + 300 \qquad (4A)$$

As described above, the in-dash type in-vehicle display device tends to have low impact absorption. Specifically, in the in-dash type in-vehicle display device, a deceleration of the impactor may be 50G or more in the head impact test.

The head impact test is a test in which the impactor collides with the hitting point P (see FIG. 2) on the main surface of the cover glass 2 through which the virtual line L passes such that an energy at the time of collision is 152 J (see [Examples] to be described later).

From the viewpoint of safety of an occupant, in the head impact test, a time during which the deceleration of the impactor exceeds 80G (hereinafter, also referred to as "time during which the deceleration exceeds 80G" for convenience) is required to be less than 3 milliseconds (ms).

From such a viewpoint, in the in-vehicle display device, it is preferred that the first layer to the n-th layer on the virtual line L further satisfy the following Expression (5).

$$S \leq -588.8 t_1 + 2660 \qquad (5)$$

It is demonstrated in [Examples] to be described later that in the case where Expression (5) is satisfied, the time during which the deceleration exceeds 80G is less than 3 milliseconds.

As described above, actually, at least one layer of the members from the cover glass (first layer) to the housing bottom member (n-th layer) may be an adhesive layer. For example, in the above-described four-layer structure, the adhesive layer may be disposed between the cover glass (first layer) and the display panel (second layer).

Here, considering the Young's modulus ($E_{adhesive\ layer}$) and the thickness ($t_{adhesive\ layer}$) of the adhesive layer, Expression (2) for obtaining the S value is expressed as follows.

$$S = E_{adhesive\ layer} \cdot t_{adhesive\ layer}^2 + E_2 \cdot t_2^2 + E_3 \cdot t_3^2 + E_4 \cdot t_4^2 \qquad (2)$$

However, the Young's modulus ($E_{adhesive\ layer}$) of the adhesive layer is much smaller than that of the other layers. The thickness ($t_{adhesive\ layer}$) of the adhesive layer is, for example, 5 to 400 µm.

Therefore, a value of "$E_{adhesive\ layer} \cdot t_{adhesive\ layer}^2$" in Expression (2) is negligibly small as compared with the other values of "$E_2 \cdot t_2^2$" to "$E_4 \cdot t_4^2$".

Therefore, even in the case where the adhesive layer is present from the first layer to the n-th layer, it may be regarded that no adhesive layer is present when considering Expression (2). In other words, the value of "$E_{adhesive\ layer} \cdot t_{adhesive\ layer}^2$" may be regarded as 0 (zero).

For the same reason, other thin film layers and resin layers contained in the cover glass (first layer) to the housing bottom member (n-th layer) may be regarded as not being present when considering Expression (2). For example, a thin film layer such as an anti-reflection (AR) layer or an anti-finger-print (AFP) layer is formed on a surface of the cover glass. In addition, the display panel includes a thin film layer such as a TFT and a transparent conductor. However, the thin film layers are extremely thinner than, for example, the cover glass itself or a glass substrate (such as soda lime glass) constituting a display panel.

In addition, a backlight unit or the like may have a resin layer, but the Young's modulus of the resin layer is extremely small.

Therefore, when the thin film layers and the resin layers are assumed to be an "m-th layer", a value of "$E_m \cdot t_m^2$" may be regarded as 0 (zero).

Examples of a configuration of an in-vehicle display device having a thin film layer include a configuration including a cover glass, an OCA, a polarizing plate, a color filter, a liquid crystal, a TFT substrate, a polarizing plate, a brightness enhancement film, a lens sheet, a diffusion plate, a light guide plate, a reflection film, a backlight unit case, a printed wiring board, a housing bottom member, and a housing resin cover.

Hereinafter, the member constituting each layer will be specifically described.

A material or the like of each member is not particularly limited as long as the layers from the cover glass to the housing bottom member on the virtual line L of the in-vehicle display device satisfy the above-described Expression (1).

In addition, each member may be a composite material formed by combining a plurality of materials.

<Cover Glass>

The cover glass is preferably a strengthened glass such as a chemically strengthened glass.

The thickness (DOL) of a compressive stress layer in the strengthened glass is, for example, 10 µm or more, preferably 15 µm or more, more preferably 25 µm or more, and still more preferably 30 µm or more. The thickness (DOL) of the compressive stress layer is, for example, 180 µm or less, and preferably 50 µm or less.

The surface compressive stress (CS) in the compressive stress layer is preferably 500 MPa or more, more preferably 650 MPa or more, and still more preferably 750 MPa or more. An upper limit of the surface compressive stress (CS) is not particularly limited, and for example, CS is preferably 1200 MPa or less.

Examples of a method for subjecting a glass to a chemical strengthening treatment to obtain a chemically strengthened glass include, typically, a method including immersing a glass in a $KNO_3$ molten salt to conduct an ion exchange treatment, followed by cooling to around room temperature. Treatment conditions such as a temperature of the $KNO_3$ molten salt and an immersion time may be set such that the surface compressive stress and the thickness of the compressive stress layer satisfy the desired values.

Examples of glass types include a soda lime glass and an aluminosilicate glass ($SiO_2$—$Al_2O_3$—$Na_2O$-based glass). Among them, the aluminosilicate glass is preferred from the viewpoint of strength.

Examples of the glass material include a glass material containing 50% to 80% of $SiO_2$, 1% to 20% of $Al_2O_3$, 6% to 20% of $Na_2O$, 0% to 11% of $K_2O$, 0% to 15% of MgO, 0% to 6% of CaO, and 0% to 5% of $ZrO_2$ in terms of mol % based on oxides.

A glass for chemical strengthening, which is based on the aluminosilicate glass, (for example, "Dragontrail (registered trademark)" manufactured by AGC Inc.) is also suitably used.

The Young's modulus ($E_1$) of the cover glass is preferably 60 GPa or more, and more preferably 70 GPa or more.

On the other hand, the Young's modulus ($E_1$) of the cover glass is preferably 90 GPa or less, more preferably 80 GPa or less, and still more preferably 75 GPa or less.

The Young's modulus of each member including the cover glass is obtained by a tensile test (JIS K7161, JIS K7113) (the same applies hereinafter).

The thickness ($t_1$) of the cover glass is preferably 0.5 mm or more, more preferably 0.7 mm or more, and still more preferably 1.1 mm or more.

On the other hand, the thickness ($t_1$) of the cover glass is preferably 2.5 mm or less, more preferably 2.0 mm or less, and still more preferably 1.3 mm or less.

The thickness of each member including the cover glass is a length in the up-down direction or a length in the Z direction in FIG. 1 (the same applies hereinafter).

The cover glass has, for example, a rectangular shape when viewed from a direction in which the main surface is viewed.

For example, in the case where the cover glass has a rectangular shape, a size of the cover glass may be a size in which a length in a longitudinal direction is 100 to 800 mm and a length in a lateral direction is 40 to 300 mm.

Here, when a mass of the in-vehicle display device per unit area of the cover glass is defined as M (unit: $g/cm^2$), the mass M and the thickness $t_1$ of the cover glass preferably satisfy the following Expressions (6) and (7).

In the case where a fixing member such as a bracket is used to fix the housing bottom member of the in-vehicle display device to an interior portion of a vehicle, the mass M includes a mass of the fixing member.

$$M \geq -0.10 t_1^4 + 0.38 t_1^3 - 0.62 t_1^2 + 0.42 t_1 + 1.75 \quad (6)$$

$$M \leq 0.03 t_1 + 2.40 \quad (7)$$

In the case where the mass M satisfies Expression (6), it is possible to obtain an in-vehicle display device in which deformation of the cover glass due to collision is suppressed and the cover glass is less likely to be broken.

In the case where the mass M satisfies Expression (7), the deceleration at the time of collision is less likely to increase, and a time during which the deceleration is high can be shortened, and thus it is possible to obtain an in-vehicle display device by which a collided object such as a human body is less likely to be damaged.

In Expression (6), as the value of the $t_1$ is 0.7 or more, a value of the mass M decreases. Therefore, from the viewpoint of reducing a weight of the in-vehicle display device, the thickness ($t_1$) of the cover glass is preferably 0.7 mm or more.

<Display Panel>

The display panel is, for example, a liquid crystal panel, an organic EL panel, a PDP, and an electronic ink panel, and may include a touch panel or the like. In general, among the display panels, the glass substrate is the thickest, and dominates rigidity of the entire display panel. Therefore, the Young's modulus of the glass substrate may be regarded as the Young's modulus of the display panel.

The Young's modulus ($E_2$) of the display panel is preferably 60 GPa or more, and more preferably 70 GPa or more.

On the other hand, the Young's modulus ($E_2$) of the display panel is preferably 90 GPa or less, and more preferably 75 GPa or less.

The thickness ($t_2$) of the display panel is preferably 1.0 mm or more, and more preferably 1.1 mm or more.

On the other hand, the thickness ($t_2$) of the display panel is preferably 2.0 mm or less, and more preferably 1.3 mm or less.

Figure 10:
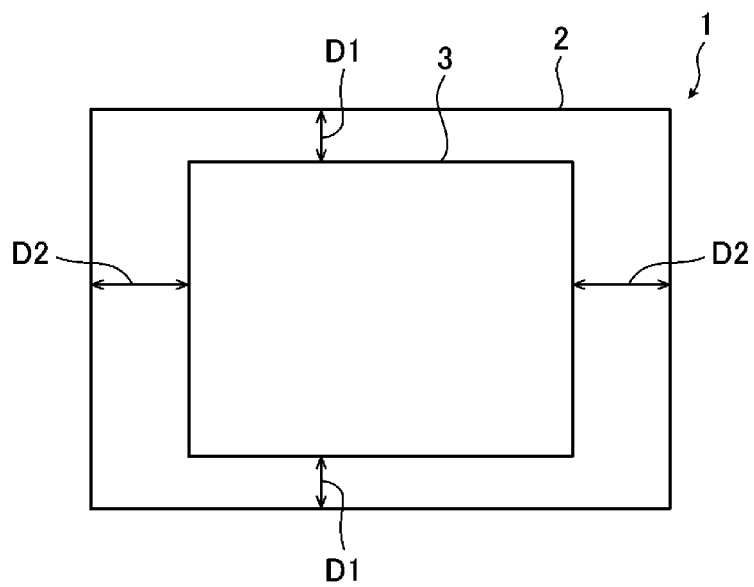
FIG. 10 is a schematic diagram illustrating a state in which a display panel is attached to a cover glass.

FIG. 10 is a schematic diagram illustrating a state in which the display panel 3 is attached to the cover glass 2.

In FIG. 10, from the viewpoint of bonding and holding the cover glass 2 with sufficient adhesive strength, the distance D1 is preferably 2 to 30 mm, and more preferably 5 to 20 mm.

In addition, from the viewpoint of the adhesive strength and a design, the distance D2 is preferably 2 to 200 mm, and more preferably 5 to 150 mm.

<Backlight Unit>

The backlight unit generally includes members such as a lens sheet, a diffusion sheet, a light guide plate, a lamp, and a reflector. Among these members, usually, the light guide plate is the thickest, and dominates rigidity of the entire backlight unit. Therefore, the Young's modulus of the light guide plate is regarded as the Young's modulus of the backlight unit.

The Young's modulus ($E_3$) of the backlight unit is preferably 1 GPa or more, more preferably 2 GPa or more, and still more preferably 60 GPa or more.

On the other hand, the Young's modulus ($E_3$) of the backlight unit is preferably 90 GPa or less, and more preferably 85 GPa or less.

The thickness ($t_3$) of the backlight unit is preferably 1 mm or more, more preferably 2 mm or more, and still more preferably 3 mm or more.

On the other hand, the thickness ($t_3$) of the backlight unit is preferably 10 mm or less, more preferably 6 mm or less, and still more preferably 5 mm or less.

Figure 11:
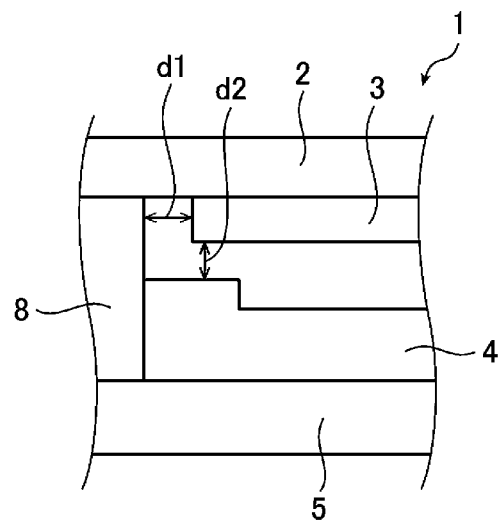
FIG. 11 is an enlarged cross-sectional view illustrating the in-vehicle display device.

FIG. 11 is an enlarged cross-sectional view illustrating the in-vehicle display device 1.

As illustrated in FIG. 11, the housing side wall 8 may be disposed at a position facing an end surface of the display panel 3 with a gap therebetween. Here, the housing side wall 8 may be a part of the backlight unit 4.

The distance d1 of the gap between the end surface of the display panel 3 and the housing side wall 8 (distance d1 between the end surface of the display panel 3 and the housing side wall 8) is preferably 2 mm or less, and more preferably 1.8 mm or less.

Accordingly, a stress applied to the cover glass 2 during the head impact test can be reduced, and the impact resistance is more excellent.

As illustrated in FIG. 11, a gap is provided between an end (portion within 5 mm from the end surface) of the display panel 3 and a member (here, a part of the backlight unit 4) closer to the housing bottom member 5 than the display panel 3. The distance d2 of the gap (distance d2 between the end of the display panel and the member closer to the housing bottom member than the display panel) is preferably 1 mm or less, and more preferably 0.5 mm or less.

<Housing Bottom Member>

The Young's modulus of the housing bottom member is, for example, preferably 1.5 GPa or more, more preferably 40 GPa or more, and still more preferably 60 GPa or more. On the other hand, the Young's modulus of the housing bottom member is preferably 250 GPa or less, more preferably 230 GPa or less, still more preferably 100 GPa or less, and particularly preferably 80 GPa or less.

In the case where the housing bottom member has a rib, the Young's modulus ($E_4$) of the housing bottom member is preferably 1.5 GPa or more and 100 GPa or less, and more preferably 40 GPa or more and 80 GPa or less.

In the case where the housing bottom member has no rib, the Young's modulus ($E_4$) of the housing bottom member is preferably 40 GPa or more and 250 GPa or less, and more preferably 60 GPa or more and 230 GPa or less.

As a material of the housing bottom member, for example, a metal (single substance) or an alloy containing a metal element such as aluminum or magnesium is preferred. In addition, the material of the housing bottom member may be a resin or a stacked body of a resin layer and a metal layer.

Reference is made to FIG. 5 for a shape or the like of the housing bottom member.

The "a" in FIG. 5, that is, the thickness of the housing bottom plate 6 is preferably 0.5 mm or more, and more preferably 1 mm or more from the viewpoint of productivity.

On the other hand, the "a" in FIG. 5 is preferably 6 mm or less, and more preferably 5 mm or less from the viewpoint of weight reduction.

The "h" in FIG. 5, that is, the thickness of the rib 7 may be 0 mm, and is preferably 1 mm or more, and more preferably 2 mm or more from the viewpoint of obtaining a rigidity-increasing effect of the rib 7.

On the other hand, the "h" in FIG. 5 is preferably 20 mm or less, and more preferably 10 mm or less, from the viewpoint of ease of production of the housing bottom member 5 and from the viewpoint of suppressing excessive enlargement of size of the housing bottom member 5.

The $w_1$ in FIG. 5 is preferably 1 mm or more, and more preferably 2 mm or more from the viewpoint of ease of production of the housing bottom member 5.

On the other hand, the $w_1$ in FIG. 5 is preferably 40 mm or less, and more preferably 30 mm or less from the viewpoint of effectively suppressing the generation of stress of the cover glass 2 in the head impact test.

The $w_2$ in FIG. 5 is preferably 1 mm or more, and more preferably 3 mm or more from the viewpoint of ease of production of the housing bottom member 5 and from the viewpoint of obtaining the rigidity-increasing effect of the rib 7.

On the other hand, the $w_2$ in FIG. 5 is preferably 20 mm or less, and more preferably 15 mm or less from the viewpoint of obtaining a weight reduction effect of the in-vehicle display device 1.

<Modification>

Figure 12:
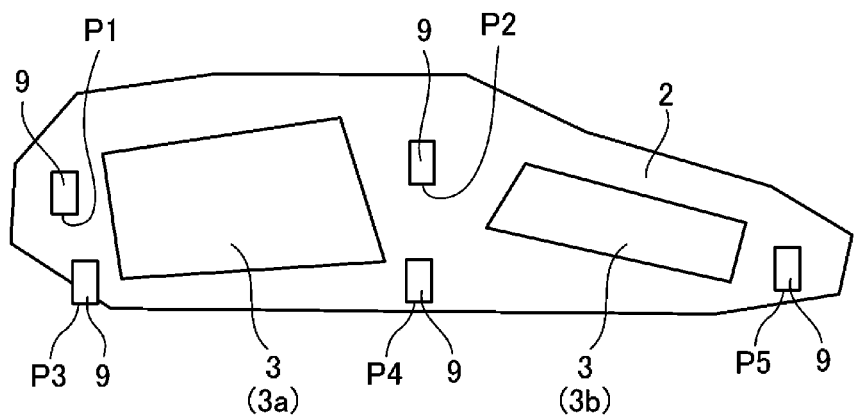
FIG. 12 is a schematic diagram illustrating a modification of the in-vehicle display device.

Although FIGS. 1 to 9 (particularly, FIGS. 1, 2, and 10) illustrate the in-vehicle display device including one display panel, the present invention is not limited thereto, and as illustrated in FIG. 12, there may be a plurality of display panels. In the case where there are the plurality of display panels, values based on Expressions (1) to (4) may be calculated for each display panel.

FIG. 12 is a schematic diagram illustrating a modification of the in-vehicle display device, and illustrates only a cover glass 2, display panels 3, and brackets 9. In FIG. 12, two display panels 3 are attached to one cover glass 2, and a housing bottom member 5 (not illustrated in FIG. 12) is fixed to an interior portion 10 (not illustrated in FIG. 12) by using the brackets 9.

Also in FIG. 12, two fixing points P1 and P2 are set. Therefore, after the virtual plane R, the ratio $Z/Z_{cg}$, the virtual line L, and the like are determined, the values based on Expressions (1) to (4) can be calculated.

In FIG. 12, the brackets 9 are disposed outside the display panels 3. As illustrated in FIG. 12, in the case where there are no two fixing points on a surface of the housing bottom member 5 facing the display panel 3, the fixing points adjacent to the outer periphery of the display panel 3 are considered.

For example, for the display panel 3 (display panel 3a) on the left side in FIG. 12, four points (fixing points P1 to P4) present outside the display panel 3 are considered as fixing points. Among them, a midpoint between the fixing point P1 and the fixing point P2, which are two fixing points from the top, is defined as the intermediate point Q. A plane passing through the intermediate point Q and perpendicular to the line connecting the fixing point P1 and the fixing point P2 is defined as the virtual plane R.

On the other hand, for the display panel 3 (display panel 3b) on the right side in FIG. 12, three points (fixing point P2, fixing point P4, and fixing point P5) present outside the display panel 3 are considered as fixing points. Among them, a midpoint between the fixing point P2 and the fixing point P5 is defined as the intermediate point Q.

In the case where the fixing points are present outside the display panel 3, the intermediate point Q may also be located outside the display panel 3 depending on a positional relation.

At this time, the distance Z (length on the intersection line between the main surface of the display panel 3 and the virtual plane R from the upper end to the point corresponding to the intermediate point Q) is a negative value, and the ratio $Z/Z_{cg}$ is 0.6 or less, and thus it can be determined that the in-vehicle display device is an in-dash type.

The shapes of the cover glass 2 and the display panel 3 are not limited to a rectangular shape (see FIGS. 1, 2, and 10), and may be a square other than a rectangular shape, or other polygons as illustrated in FIG. 12. The cover glass 2 and the display panel 3 may also have other shapes such as a circular shape.

In addition, the cover glass 2 and the display panel 3 are not limited to flat members, and may be curved plate members.

EXAMPLES

Hereinafter, the embodiment of the present invention will be specifically described with reference to Examples. However, the present invention is not limited to the following Examples.

The examples Nos. 1 to 18 and 26 to 28 are Examples and the examples Nos. 19 to 25 are Comparative Examples.

In the Examples and the Comparative Examples, a head impact test was simulated by preparing a simulation model of an display device 1 based on FIGS. 1 to 11 and executing a simulation of applying an impact to the simulation model. As illustrated in FIG. 1, the model of the display device 1 included a cover glass 2 (first layer), a display panel 3 (second layer), a backlight unit 4 (third layer), and a housing bottom member 5 (fourth layer).

A model of the cover glass simulated a rectangular chemically strengthened glass obtained by subjecting a glass for chemical strengthening, which is based on an aluminosilicate glass, ("Dragontrail" manufactured by AGC Inc.) to a chemical strengthening treatment, and DOL was 35 μm and CS was 750 MPa.

The size of the cover glass was 250 mm in a longitudinal direction and 150 mm in a lateral direction.

The Young's modulus ($E_1$) and the thickness ($t_1$) of the cover glass will be described later.

A model of the display panel simulated a configuration in which polarizing plates (material: triacetylcellulose) were attached to both surfaces of a soda lime glass, and the thickness thereof was 1.1 mm.

A model of the adhesive layer simulated OCA ("MHIM-FWD" manufactured by Nichieikako Co., Ltd.).

A model of the backlight unit simulated a plate-shaped body (material: polycarbonate) and the thickness thereof was 3 mm.

A model of the housing bottom member and the housing side wall simulated an aluminum material.

Each portion was assumed to be bonded by using a double-sided tape ("VHX1701-04" manufactured by 3M, thickness: 0.4 mm). The housing bottom member was provided with grid-shaped ribs (see FIG. 3).

In this simulation, the housing was fixed to an interior portion of a vehicle by using brackets.

A model of the bracket was assumed to use a member having a Young's modulus of 206 GPa and bent at a right angle at a length ratio of 2:5:2 so as to simulate SS400 steel having a thickness of 2 mm, a width of 20 mm, and a length of 50 mm.

In the head impact test to be described later, it was assumed that a sponge ("Memory Foam CF-45M" manufactured by Aearo Technologies LLC) having a thickness of 50 mm was disposed between the housing bottom member and the interior portion.

The values of the ratio $Z/Z_{cg}$, the $t_1$, the a, the $w_1$, the $w_2$, the h, and the X were adjusted so as to be different for each specimen of the manufactured in-vehicle display devices. The values are shown in Table 1 below. Here, the a, the $w_1$, the $w_2$, and the h are values used for obtaining the $t_4$, that is, the a, the $w_1$, the $w_2$, and the h related to the housing bottom member. Further, Table 1 below also shows the value of the mass M (mass of the in-vehicle display device per unit area of the cover glass).

| Other values were set as follows in all specimens. |
| --- |
| $E_1$: 74 GPa (Young's modulus of cover glass) |
| $E_2$: 73 GPa (Young's modulus of soda lime glass) |
| $E_3$: 2.2 GPa (Young's modulus of polycarbonate) |
| $E_4$: 70 GPa (Young's modulus of aluminum) |
| $t_2$: 1.1 mm |
| $t_3$: 3 mm |
| D1: 12 mm |
| D2: 40 mm |
| d1: 1.5 mm |
| d2: 0.5 mm |

In each of the examples, the mass M of the in-vehicle display device per unit area of the cover glass satisfied the above-described Expressions (6) and (7).

<Head Impact Test (HIT)>

A simulation was executed in which an impactor collides with the hitting point P of the model generated in each example under the following conditions.

An impactor (material: aluminum, diameter: 165 mm, mass: 6.8 kg), which is a hemispherical rigid body, was made to collide with the hitting point P (see FIG. 2) of the cover glass. A direction in which the impactor collided with the cover glass was a direction at an angle of 90° with respect to the main surface of the cover glass. A maximum collision speed was set to 24.1 km/h, and an energy at the time of collision was set to 152 J. At this time, a deceleration (unit: G) of the impactor was obtained.

(Evaluation Results)

Analysis results of the stress generated in the cover member 2 when the impactor collided with the hitting point P were acquired by the simulation. In the case where the maximum stress generated in the cover member 2 was equal to or less than a predetermined threshold and was less than the threshold by 12% or more, the determination was A; in the case where the maximum stress was less than the threshold by 0% or more and less than 12%, the determination was B; in the case where the maximum stress was greater than the threshold and was greater than the threshold by more than 0% and less than 12%, the determination was C; and in the case where the maximum stress was greater than the threshold by 12% or more, the determination was D.

When there are specimens having the same configuration, there may be a case in which the cover member (cover glass) 2 is broken and a case in which the cover member (cover glass) 2 is not broken even with the same generated stress due to a strength variation. As a value of the generated stress is closer to the breaking generation threshold, a breaking generation frequency increases.

In the A and the B, the generated maximum stress is equal to or less than the threshold, and the cover glass is less likely to be broken in the head impact test. In the C and the D, the generated maximum stress is greater than the threshold, and the cover glass is likely to be broken in the head impact test. Further, in the case of A, the breaking generation frequency can be significantly reduced.

In addition, as shown in Table 1, in the simulation, analysis results of the deceleration of the impactor were also acquired.

TABLE 1

| | $Z/Z_{cg}$ | Value of right side of Expression (1) | | S value | Value of right side of Expression (5) | $t_1$ [mm] | a [mm] | $w_1$ [mm] | $w_2$ [mm] | h [mm] | X [mm] | Y [mm] |
|---|---|---|---|---|---|---|---|---|---|---|---|---|
| No. 1 | 0.45 | 969 | < | 1167 ≤ | 2330 | 0.56 | 3 | 26 | 6 | 2 | 80 | 57 |
| No. 2 | 0.45 | 757 | < | 1167 ≤ | 2071 | 1 | 3 | 26 | 6 | 2 | 80 | 57 |
| No. 3 | 0.45 | 590 | < | 751 ≤ | 1895 | 1.3 | 2 | 26 | 6 | 2 | 80 | 57 |
| No. 4 | 0.45 | 191 | < | 462 ≤ | 1482 | 2 | 1 | 26 | 6 | 2 | 80 | 57 |
| No. 5 | 0.35 | 969 | < | 1426 ≤ | 2330 | 0.56 | 3.5 | 26 | 6 | 2 | 80 | 72 |
| No. 6 | 0.35 | 969 | < | 1720 ≤ | 2330 | 0.56 | 4 | 26 | 6 | 2 | 80 | 72 |
| No. 7 | 0.39 | 969 | < | 1426 ≤ | 2330 | 0.56 | 3.5 | 26 | 6 | 2 | 80 | 67 |
| No. 8 | 0.39 | 969 | < | 1720 ≤ | 2330 | 0.56 | 4 | 26 | 6 | 2 | 80 | 67 |
| No. 9 | 0.42 | 757 | < | 1426 ≤ | 2071 | 1 | 3.5 | 26 | 6 | 2 | 80 | 62 |
| No. 10 | 0.42 | 969 | < | 1426 ≤ | 2330 | 0.56 | 3.5 | 26 | 6 | 2 | 80 | 62 |
| No. 11 | 0.45 | 757 | < | 1015 ≤ | 2071 | 1 | 3 | 26 | 12 | 1 | 80 | 57 |
| No. 12 | 0.45 | 757 | < | 1547 ≤ | 2071 | 1 | 3 | 26 | 3 | 4 | 80 | 57 |
| No. 13 | 0 | 757 | < | 1167 ≤ | 2071 | 1 | 3 | 26 | 6 | 2 | 100 | 125 |
| No. 14 | 0 | 969 | < | 1720 ≤ | 2330 | 0.56 | 4 | 26 | 6 | 2 | 100 | 125 |
| No. 15 | 0 | 757 | < | 1720 ≤ | 2071 | 1 | 4 | 26 | 6 | 2 | 100 | 125 |
| No. 16 | 0 | 969 | < | 2145 ≤ | 2330 | 0.56 | 4 | 26 | 6 | 3 | 100 | 125 |
| No. 17 | 0 | 757 | < | 2045 ≤ | 2071 | 1 | 3 | 26 | 6 | 4 | 100 | 125 |
| No. 18 | 0 | 476 | < | 1720 ≤ | 1777 | 1.5 | 4 | 26 | 6 | 2 | 100 | 125 |
| No. 19 | 0.45 | 969 | ≥ | 751 ≤ | 2330 | 0.56 | 2 | 26 | 6 | 2 | 80 | 57 |
| No. 20 | 0.45 | 969 | ≥ | 942 ≤ | 2330 | 0.56 | 2.5 | 26 | 6 | 2 | 80 | 57 |
| No. 21 | 0.45 | 757 | ≥ | 751 ≤ | 2071 | 1 | 2 | 26 | 6 | 2 | 80 | 57 |
| No. 22 | 0.45 | 590 | ≥ | 462 ≤ | 1895 | 1.3 | 1 | 26 | 6 | 2 | 80 | 57 |
| No. 23 | 0.45 | 476 | ≥ | 462 ≤ | 1777 | 1.5 | 1 | 26 | 6 | 2 | 80 | 57 |
| No. 24 | 0.25 | 969 | ≥ | 751 ≤ | 2330 | 0.56 | 2 | 26 | 6 | 2 | 56 | 87 |
| No. 25 | 0.25 | 969 | ≥ | 942 ≤ | 2330 | 0.56 | 2.5 | 26 | 6 | 2 | 56 | 87 |
| No. 26 | 0 | 757 | < | 2413 > | 2071 | 1 | 5 | 26 | 6 | 2 | 100 | 125 |
| No. 27 | 0 | 969 | < | 2413 > | 2330 | 0.56 | 5 | 26 | 6 | 2 | 100 | 125 |
| No. 28 | 0 | 476 | < | 2413 > | 1777 | 1.5 | 5 | 26 | 6 | 2 | 100 | 125 |

| | Value of right side of Expression (6) | | M [g/cm²] | | Value of right side of Expression (7) | Breaking | Deceleration [G] | Time during which deceleration exceeds 80 G [ms] | |
|---|---|---|---|---|---|---|---|---|---|
| No. 1 | 1.85 | ≤ | 1.90 | ≤ | 2.42 | B | 59 | 0 | Example |
| No. 2 | 1.83 | ≤ | 2.01 | ≤ | 2.43 | B | 60 | 0 | Example |
| No. 3 | 1.80 | ≤ | 1.82 | ≤ | 2.44 | B | 58 | 0 | Example |
| No. 4 | 1.55 | ≤ | 1.72 | ≤ | 2.46 | B | 60 | 0 | Example |
| No. 5 | 1.85 | ≤ | 2.04 | ≤ | 2.42 | B | 69 | 0 | Example |
| No. 6 | 1.85 | ≤ | 2.17 | ≤ | 2.42 | B | 72 | 0 | Example |
| No. 7 | 1.85 | ≤ | 2.04 | ≤ | 2.42 | B | 70 | 0 | Example |
| No. 8 | 1.85 | ≤ | 2.17 | ≤ | 2.42 | B | 70 | 0 | Example |
| No. 9 | 1.83 | ≤ | 2.15 | ≤ | 2.43 | B | 66 | 0 | Example |
| No. 10 | 1.85 | ≤ | 2.04 | ≤ | 2.42 | B | 65 | 0 | Example |
| No. 11 | 1.83 | ≤ | 2.02 | ≤ | 2.43 | B | 60 | 0 | Example |
| No. 12 | 1.83 | ≤ | 2.01 | ≤ | 2.43 | B | 61 | 0 | Example |
| No. 13 | 1.83 | ≤ | 2.01 | ≤ | 2.43 | A | 86 | 2 | Example |
| No. 14 | 1.85 | ≤ | 2.17 | ≤ | 2.42 | A | 90 | 2.4 | Example |

TABLE 1-continued

| | | | | | | | | | |
|---|---|---|---|---|---|---|---|---|---|
| No. 15 | 1.83 | ≤ | 2.28 | ≤ | 2.43 | A | 94 | 2.8 | Example |
| No. 16 | 1.85 | ≤ | 2.18 | ≤ | 2.42 | A | 94 | 2.8 | Example |
| No. 17 | 1.83 | ≤ | 2.02 | ≤ | 2.43 | A | 99 | 2.9 | Example |
| No. 18 | 1.76 | ≤ | 2.41 | ≤ | 2.45 | B | 101 | 2.6 | Example |
| No. 19 | 1.85 | > | 1.63 | ≤ | 2.42 | C | 55 | 0 | Comparative Example |
| No. 20 | 1.85 | > | 1.77 | ≤ | 2.42 | C | 59 | 0 | Comparative Example |
| No. 21 | 1.83 | > | 1.74 | ≤ | 2.43 | C | 57 | 0 | Comparative Example |
| No. 22 | 1.80 | > | 1.55 | ≤ | 2.44 | C | 58 | 0 | Comparative Example |
| No. 23 | 1.76 | > | 1.61 | ≤ | 2.45 | C | 58 | 0 | Comparative Example |
| No. 24 | 1.85 | > | 1.63 | ≤ | 2.42 | C | 84 | 0.4 | Comparative Example |
| No. 25 | 1.85 | > | 1.77 | ≤ | 2.42 | D | 85 | 0.4 | Comparative Example |
| No. 26 | 1.83 | ≤ | 2.55 | > | 2.43 | A | 104 | 3.2 | Example |
| No. 27 | 1.85 | ≤ | 2.44 | > | 2.42 | A | 103 | 3.2 | Example |
| No. 28 | 1.76 | ≤ | 2.68 | > | 2.45 | A | 109 | 3 | Example |

Among the examples Nos. 1 to 18 and 26 to 28, in the examples Nos. 26 to 28 that did not satisfy Expression (5), the time during which the deceleration exceeds 80G was 3 ms or more, whereas in the examples Nos. 1 to 18 that satisfied Expression (5), the time during which the deceleration exceeds 80G was less than 3 ms.

Each of the examples Nos. 1 to 18 and 26 to 28 satisfied Expression (6).

When the examples Nos. 1 to 18 and 26 to 28 are compared with each other, the examples Nos. 1 to 18 in which Expression (7) was satisfied tended to show a smaller value of the deceleration of the impactor and a shorter time during which the deceleration exceeds 80G, as compared with the examples Nos. 26 to 28 in which Expression (7) was not satisfied.

Although the present invention has been described in detail with reference to specific embodiments, it is apparent to those skilled in the art that various changes and modifications can be made without departing from the spirit and scope of the present invention. The present application is based on a Japanese Patent Application (No. 2021-066497) filed on Apr. 9, 2021, the contents of which are incorporated herein by reference.

REFERENCE SIGNS LIST

1: in-vehicle display device
2: cover glass
3: display panel
4: backlight unit
5: housing bottom member
6: housing bottom plate
7: rib
8: housing side wall
9 (91, 92, 93, 94): bracket
10: interior portion

What is claimed is:

1. An in-vehicle display device comprising n layers from a cover glass to a housing bottom member and comprising at least a display panel midway in the n layers thereof, wherein
a member of each layer includes only a plate-shaped member, or includes the plate-shaped member and a rib,
the housing bottom member is fixed to an interior portion of a vehicle at at least two fixing points,
when a virtual plane passing through an intermediate point between the two fixing points and perpendicular to a line connecting the two fixing points is defined as a virtual plane R, a length of an intersection line between a main surface of the cover glass and the virtual plane R is defined as a distance $Z_{cg}$, and a length on an intersection line between a main surface of the display panel and the virtual plane R from an upper end to a point corresponding to the intermediate point is defined as a distance Z,
a ratio $Z/Z_{cg}$ of the distance Z to the distance $Z_{cg}$ is 0.6 or less, and
the n layers from the cover glass to the housing bottom member on a virtual line L passing through a 5 mm lower end side from the upper end of the intersection line between the main surface of the display panel and the virtual plane R in a thickness direction of the in-vehicle display device satisfy the following Expression (1), $$S > \left( \frac{1}{0.021 \times t_1^2 + 0.068} - t_1^2 \right) \times E_1 \tag{1}$$

in Expression (1),
$E_1$: Young's modulus of the cover glass,
$t_1$: thickness of the cover glass, and
S is represented by the following Expression (2), $$S = E_2 \cdot t_2^2 + \ldots + E_n \cdot t_n^2 \tag{2}$$

in Expression (2),
$E_2$: Young's modulus of a second layer,
$t_2$: thickness of the second layer,
$E_n$: Young's modulus of an n-th layer,
$t_n$: thickness of the n-th layer, and
a thickness $t_k$ of any k-th layer among the 1 to n layers including the $t_1$, the $t_2$, and the $t_n$ is represented by the following Expression (3), $$t_k = \sqrt[3]{a^3 + \frac{w_2}{w_1} h^3 + 12a\left(b - \frac{a}{2}\right)^2 + 12\frac{w_2}{w_1} h\left(\frac{h}{2} + a - b\right)^2} \tag{3}$$

in Expression (3),
a: thickness of the plate-shaped member of the k-th layer, $w_2$: width of a rib Rb1 closest to a point p on the plate-shaped member of the k-th layer through which the virtual line L passes, among the ribs, $w_1$: distance between the rib Rb1 and a rib Rb2 located in an extending direction of a line passing through the point p on the plate-shaped member through which the virtual line L passes and perpendicular to a center line of the rib Rb1, h: thickness of the rib Rb1 and the rib Rb2, and b is represented by the following Expression (4), $$b = \frac{0.5 w_1 \cdot a^2 + 0.5 w_2 \cdot h^2 + w_2 \cdot a \cdot h}{w_1 \cdot a + w_2 \cdot h} \quad (4)$$

wherein the n is an integer of 3 or more, the h is a number of 0 or more, the Young's modulus has a unit of GPa, and the thickness, the distance, and the width have units of mm.

2. The in-vehicle display device according to claim 1, wherein
the housing bottom member is fixed to the interior portion by using a bracket.

3. The in-vehicle display device according to claim 1, wherein
the n layers from the cover glass to the housing bottom member on the virtual line L further satisfy the following Expression (5), $$S \leq -588.8 t_1 + 2660 \quad (5).$$

4. The in-vehicle display device according to claim 1, wherein
the cover glass is a strengthened glass having a compressive stress layer having a thickness of 10 μm or more,
the cover glass has a thickness of 0.5 to 2.5 mm,
the cover glass has a Young's modulus of 60 to 90 GPa,
the display panel has a Young's modulus of 60 to 90 GPa, and
the housing bottom member has a Young's modulus of 40 to 250 GPa.

5. The in-vehicle display device according to claim 1, wherein
a deceleration of an impactor is 50 G or more in a head impact test in which the impactor collides with a hitting point P on the main surface of the cover glass through which the virtual line L passes such that an energy at the time of collision is 152 J.

6. The in-vehicle display device according to claim 1, wherein
when a mass of the in-vehicle display device per unit area of the cover glass is defined as M, the following Expressions (6) and (7) are satisfied, $$M \geq -0.10 t_1^4 + 0.38 t_1^3 - 0.62 t_1^2 + 0.42 t_1 + 1.75 \quad (6)$$

$$M \leq 0.03 t_1 + 2.40 \quad (7)$$

wherein the mass M has a unit of g/cm².

7. The in-vehicle display device according to claim 1, further comprises a housing side wall provided at a position facing an end surface of the display panel, wherein
a distance d1 between the end surface of the display panel and the housing side wall is 2 mm or less.

8. The in-vehicle display device according to claim 1, wherein
a distance d2 between an end of the display panel and a member closer to the housing bottom member than the display panel is 1 mm or less.

9. The in-vehicle display device according to claim 1, wherein
the n layers from the cover glass to the housing bottom member on the virtual line L satisfy the following Expression (4A), $$S \geq \left( \frac{1}{0.021 \times t_1^2 + 0.068} - t_1^2 \right) \times E_1 + 300. \quad (4A)$$

10. An in-vehicle display device comprising n layers from a cover glass to a housing bottom member and comprising at least a display panel midway in the n layers thereof, wherein
a member of each layer includes only a plate-shaped member, or includes the plate-shaped member and a rib,
the housing bottom member is fixed to an interior portion of a vehicle at one fixing point,
when a virtual plane passing through the fixing point and including a thickness direction and a vertical direction of the cover glass at the fixing point is defined as a virtual plane R, a length of an intersection line between a main surface of the cover glass and the virtual plane R is defined as a distance $Z_{cg}$, and a length on an intersection line between a main surface of the display panel and the virtual plane R from an upper end to a point corresponding to the fixing point is defined as a distance Z,
a ratio $Z/Z_{cg}$ of the distance Z to the distance $Z_{cg}$ is 0.6 or less, and
the n layers from the cover glass to the housing bottom member on a virtual line L passing through a 5 mm lower end side from the upper end of the intersection line between the main surface of the display panel and the virtual plane R in a thickness direction of the in-vehicle display device satisfy the following Expression (1), $$S > \left( \frac{1}{0.021 \times t_1^2 + 0.068} - t_1^2 \right) \times E_1 \quad (1)$$

in Expression (1), $E_1$: Young's modulus of the cover glass, $t_1$: thickness of the cover glass, and S is represented by the following Expression (2), $$S = E_2 \cdot t_2^2 + \ldots + E_n \cdot t_n^2 \quad (2)$$

in Expression (2), $E_2$: Young's modulus of a second layer, $t_2$: thickness of the second layer, $E_n$: Young's modulus of an n-th layer, $t_n$: thickness of the n-th layer, and a thickness $t_k$ of any k-th layer among the 1 to n layers including the $t_1$, the $t_2$, and the $t_n$ is represented by the following Expression (3), $$t_k = \sqrt[3]{a^3 + \frac{w_2}{w_1} h^3 + 12 a \left( b - \frac{a}{2} \right)^2 + 12 \frac{w_2}{w_1} h \left( \frac{h}{2} + a - b \right)^2} \quad (3)$$

in Expression (3), a: thickness of the plate-shaped member of the k-th layer, $w_2$: width of a rib Rb1 closest to a point p on the plate-shaped member of the k-th layer through which the virtual line L passes, among the ribs, $w_1$: distance between the rib Rb1 and a rib Rb2 located in an extending direction of a line passing through the point p on the plate-shaped member through which the virtual line L passes and perpendicular to a center line of the rib Rb1, h: thickness of the rib Rb1 and the rib Rb2, and b is represented by the following Expression (4), $$b = \frac{0.5w_1 \cdot a^2 + 0.5w_2 \cdot h^2 + w_2 \cdot a \cdot h}{w_1 \cdot a + w_2 \cdot h} \tag{4}$$

wherein the n is an integer of 3 or more, the h is a number of 0 or more, the Young's modulus has a unit of GPa, and the thickness, the distance, and the width have units of mm.

11. The in-vehicle display device according to claim 10, wherein the housing bottom member is fixed to the interior portion by using a bracket.

12. The in-vehicle display device according to claim 10, wherein the n layers from the cover glass to the housing bottom member on the virtual line L further satisfy the following Expression (5), $$S \leq -588.8t_1 + 2660 \tag{5}.$$

13. The in-vehicle display device according to claim 10, wherein the cover glass is a strengthened glass having a compressive stress layer having a thickness of 10 μm or more, the cover glass has a thickness of 0.5 to 2.5 mm, the cover glass has a Young's modulus of 60 to 90 GPa, the display panel has a Young's modulus of 60 to 90 GPa, and the housing bottom member has a Young's modulus of 40 to 250 GPa.

14. The in-vehicle display device according to claim 10, wherein a deceleration of an impactor is 50 G or more in a head impact test in which the impactor collides with a hitting point P on the main surface of the cover glass through which the virtual line L passes such that an energy at the time of collision is 152 J.

15. The in-vehicle display device according to claim 10, wherein when a mass of the in-vehicle display device per unit area of the cover glass is defined as M, the following Expressions (6) and (7) are satisfied, $$M \geq -0.10t_1^4 + 0.38t_1^3 - 0.62t_1^2 + 0.42t_1 + 1.75 \tag{6}$$

$$M \leq 0.03t_1 + 2.40 \tag{7}$$

wherein the mass M has a unit of g/cm².

16. The in-vehicle display device according to claim 10, further comprises a housing side wall provided at a position facing an end surface of the display panel, wherein a distance d1 between the end surface of the display panel and the housing side wall is 2 mm or less.

17. The in-vehicle display device according to claim 10, wherein a distance d2 between an end of the display panel and a member closer to the housing bottom member than the display panel is 1 mm or less.

18. The in-vehicle display device according to claim 10, wherein the n layers from the cover glass to the housing bottom member on the virtual line L satisfy the following Expression (4A), $$S \geq \left(\frac{1}{0.021 \times t_1^2 + 0.068} - t_1^2\right) \times E_1 + 300. \tag{4A}$$

* * * * *